United States Patent
Schneider

(10) Patent No.: US 11,424,674 B2
(45) Date of Patent: Aug. 23, 2022

(54) CIRCUIT ASSEMBLY FOR INTERMEDIATE CIRCUIT BALANCING

(71) Applicant: ebm-papst Mulfingen GmbH & Co. KG, Mulfingen (DE)

(72) Inventor: Alex Schneider, Künzelsau (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 0 days.

(21) Appl. No.: 17/254,401

(22) PCT Filed: Jul. 9, 2019

(86) PCT No.: PCT/EP2019/068441
§ 371 (c)(1),
(2) Date: Dec. 21, 2020

(87) PCT Pub. No.: WO2020/020635
PCT Pub. Date: Jan. 30, 2020

(65) Prior Publication Data
US 2021/0194355 A1 Jun. 24, 2021

(30) Foreign Application Priority Data
Jul. 26, 2018 (DE) .......................... 102018118068.3

(51) Int. Cl.
*H02M 1/42* (2007.01)
*H02M 3/158* (2006.01)
(Continued)

(52) U.S. Cl.
CPC ....... *H02M 1/4225* (2013.01); *H02M 1/4233* (2013.01); *H02M 3/1582* (2013.01);
(Continued)

(58) Field of Classification Search
CPC ............. H02M 1/4225; H02M 1/4233; H02M 3/1582; H02M 7/062; H02M 1/0085; H02M 1/008; Y02B 70/10
See application file for complete search history.

(56) References Cited

U.S. PATENT DOCUMENTS 5,682,022 A 10/1997 Schroeder-Brumloop
7,489,530 B2 * 2/2009 Paull ..................... H02M 7/483
363/131

(Continued)

FOREIGN PATENT DOCUMENTS

| CN | 207299645 U | 5/2018 | |
|---|---|---|---|
| EP | 2393182 A | 12/2011 | |
| WO | WO-2019015812 A1 * | 1/2019 | ............ H02M 5/458 |

*Primary Examiner* — Yusef A Ahmed
(74) *Attorney, Agent, or Firm* — Dickinson Wright PLLC

(57) ABSTRACT

The disclosure relates to a circuit assembly (1) for intermediate circuit balancing of an intermediate circuit voltage UZK of a DC intermediate circuit fed by an alternating mains voltage UN for supplying a voltage to one or more devices, the circuit having a voltage divider (SP) configurable in terms of the voltage divider ratio and including a plurality of electric two-terminal devices (R1, R2, . . . , R6) by which the intermediate circuit voltage UZK is divided into voltage portions at each two-terminal device, the circuit having at least one first intermediate circuit capacitor (C1) chargeable to a first portion UZK,1 of the intermediate circuit voltage UZK, and the circuit having at least one second intermediate circuit capacitor (C2) chargeable to a second portion UZK,2 of the intermediate circuit voltage UZK.

11 Claims, 2 Drawing Sheets

(51) Int. Cl.
  *H02M 7/06* (2006.01)
  *H02M 1/00* (2006.01)
(52) U.S. Cl.
  CPC ............ *H02M 7/062* (2013.01); *H02M 1/008* (2021.05); *H02M 1/0085* (2021.05)

(56) References Cited

U.S. PATENT DOCUMENTS

| | | | |
|---|---|---|---|
| 9,246,418 B2* | 1/2016 | Becker | H02P 29/0241 |
| 9,291,380 B2* | 3/2016 | Sauer | H02J 9/062 |
| 9,379,536 B2* | 6/2016 | Lukas | H02H 7/20 |
| 10,541,623 B1* | 1/2020 | Michal | H02M 7/483 |
| 2003/0165068 A1* | 9/2003 | Tomonaga | H02M 3/335 |
| | | | 363/37 |
| 2004/0047167 A1* | 3/2004 | Prasad | H02M 1/4225 |
| | | | 363/125 |
| 2005/0083716 A1* | 4/2005 | Marquardt | H02M 5/271 |
| | | | 363/132 |
| 2009/0225572 A1* | 9/2009 | Paull | H02M 7/5387 |
| | | | 363/56.01 |
| 2009/0230889 A1* | 9/2009 | Zhang | H05B 41/2888 |
| | | | 315/307 |
| 2010/0076612 A1* | 3/2010 | Robertson | H02M 1/4208 |
| | | | 700/286 |
| 2012/0033449 A1* | 2/2012 | Koch | H02M 3/33523 |
| | | | 363/15 |
| 2015/0028886 A1* | 1/2015 | Rekers | G01R 31/1272 |
| | | | 324/551 |
| 2015/0253052 A1* | 9/2015 | Sauer | H02M 1/44 |
| | | | 318/400.3 |
| 2017/0133924 A1* | 5/2017 | Alvarez Valenzuela | H02M 7/5395 |
| 2018/0019684 A1* | 1/2018 | Yamashita | H03K 17/08148 |
| 2018/0026522 A1* | 1/2018 | Haas | H02H 9/02 |
| | | | 363/49 |
| 2019/0028032 A1* | 1/2019 | Xiong | H02M 1/08 |
| 2019/0181755 A1* | 6/2019 | Swamy | H02M 3/1582 |
| 2019/0229616 A1* | 7/2019 | Illiano | H02M 3/158 |

* cited by examiner

CIRCUIT ASSEMBLY FOR INTERMEDIATE CIRCUIT BALANCING

RELATED APPLICATIONS

This application claims priority to and is a 35 U.S.C. § 371 national phase application of PCT/EP2019/068441, filed Jul. 9, 2019 and claims priority to German Patent Application No. 10 2018 118 068.3, filed Jul. 26, 2018, the entire contents of which are incorporated herein by reference in their entirety.

FIELD

The disclosure relates to an improved circuit assembly which is particularly suitable for use in open-loop and closed-loop control in refrigeration installations.

BACKGROUND

From DE 10 2015 108 910 D1, an example of a cooling device is known, in particular for cooling components accommodated in a control cabinet. From the prior art, such cooling devices are known, in which the electric components with regard to the voltage supply necessary for the operation are adapted to the electric mains voltages available in the geographic area of use of the cooling device. Thus, for example, it is conventional to offer, for each power stage of a cooling device, a respective variant of a mains voltage of 115 V, 230 V and for 400 V, in order to be able to provide the cooling device to the greatest possible extent worldwide. In addition, various special voltages exist.

In the prior art, the input voltage is rectified, typically using a rectifier, before it is processed. Moreover, a common capacitor is typically connected in the intermediate circuit for the DC supply. This is associated with high costs, since capacitors must have the high nominal voltage of the intermediate circuit. Overall, we have found that the efficiency is unsatisfactory, since, due to the rectifier, additional power loss and waste heat are generated, which means additional expenditure for cooling.

BRIEF SUMMARY

Therefore, the underlying aim of the disclosure is to overcome the aforementioned disadvantages and to create an improved circuit assembly which can be produced cost-effectively and has an improved useful life and which, in particular, contributes toward functionally improving the open-loop and closed-loop control electronics in which the circuit assembly is used.

This aim is achieved by the combination of features according to claim 1.

A fundamental idea of the disclosure consists in using circuit designs which only partially need the rectifier or, to the extent possible, do not need the rectifier at all, i.e., which ensure an efficient intermediate circuit processing for the supply of electronic components by means of an appropriately matched circuit assembly.

Proposed for this purpose according to the disclosure is a circuit assembly for intermediate circuit balancing of an intermediate circuit voltage UZK of a DC intermediate circuit fed by an alternating mains voltage UN for supplying a voltage to one or more devices, comprising a) a voltage divider configurable in terms of the voltage divider ratio and consisting of a plurality of electric two-terminal devices R1, R2, . . . , R6 by which the intermediate circuit voltage UZK is divided into voltage portions at each two-terminal device, b) at least one first intermediate circuit capacitor chargeable to a first portion UZK,1 of the intermediate circuit voltage UZK, c) at least one second intermediate circuit capacitor chargeable to a second portion UZK,2 of the intermediate circuit voltage UZK, wherein a connection line of at least one voltage divider tap of the voltage divider is connected between two two-terminal devices and the at least first and second capacitors in such a manner that the at least two capacitors are chargeable at a predetermined voltage ratio UZK,1/UZK,2.

Here it is particularly advantageous if the at least two capacitors are chargeable at the divider ratio 50/50 or in a freely selectable manner to the intermediate circuit voltage.

In another advantageous embodiment of the circuit assembly, an electronic intermediate circuit processing for processing the intermediate circuit voltage is provided before the voltage divider.

Advantageously, for the voltage processing of the intermediate DC voltage, a DC converter in the form of a flyback converter or boost-buck converter is used.

In a first advantageous embodiment of the disclosure, it is provided that the intermediate circuit processing is implemented as a bridgeless power factor correction circuit (bridgeless PFC).

In an additional advantageous embodiment of the disclosure, it is provided that the intermediate circuit processing is implemented as a power factor correction circuit (interleaved PFC) with a partial bridge.

In a particularly advantageous embodiment of the disclosure, it is provided that, via the configuration of the configurable two-terminal devices, the voltage divider ratio can be freely set for the intermediate circuit capacitors in accordance with a desired, particularly user-specific, required ratio.

It is also advantageous if a galvanic separation is provided between the mains voltage-side input side and the output side of the DC intermediate circuit, which can already occur, for example, by the use of a corresponding flyback converter, in which the energy is transmitted via electromagnetic transformer (for example, coils or inductances) from a primary side to a secondary side of the flyback converter.

An additional aspect of the present disclosure relates to a system for the common voltage supply of the respective output stages of multiple devices with a circuit assembly as described above, wherein the respective DC/AC output stages of the devices are supplied or connected directly or alternatively indirectly via a DC/DC voltage converter with the voltage from the intermediate circuit.

BRIEF DESCRIPTION OF THE DRAWINGS

Furthermore, it is advantageous if the system is a cooling system which comprises a refrigeration circuit closed-loop control which is connected to the intermediate circuit of the circuit assembly via a DC converter.

Other advantageous developments of the disclosure are characterized in the dependent claims or represented in further detail below together with the description of the preferred embodiment of the disclosure in reference to the figures. The figures show:

Below, the disclosure is described in further detail in reference to FIGS. 1 and 2, wherein identical reference symbols refer to structurally and/or functionally identical features.

DETAILED DESCRIPTION

Figure 1:
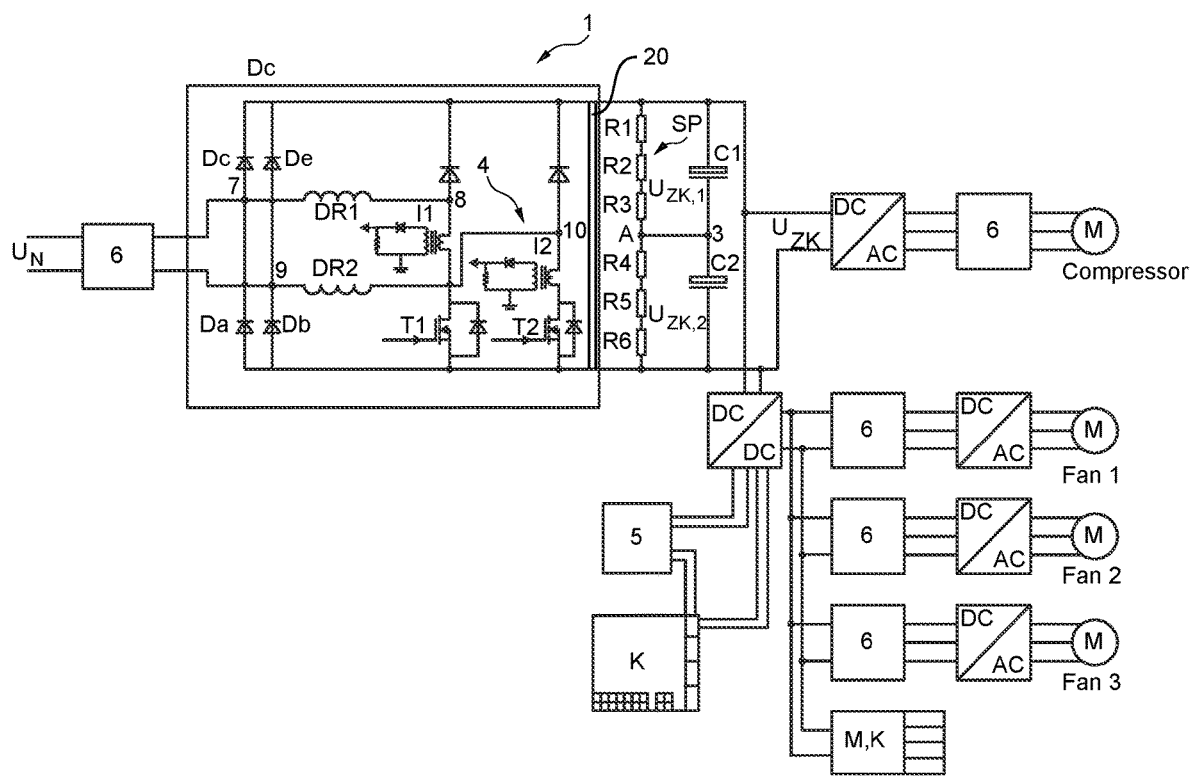
FIG. 1 an embodiment example of a circuit assembly according to the disclosure, and FIG. 2 an alternative embodiment for the circuit assembly from FIG. 1.

In FIG. 1, an embodiment example of a circuit assembly 1 according to the disclosure is shown. The represented circuit assembly 1 is designed for intermediate circuit balancing of an intermediate circuit voltage UZK of a DC intermediate circuit fed by an alternating mains voltage UN for supplying a voltage to one or more of the devices M, K represented in the system, which comprise here, for example, a compressor M, two fans M, a pump M, a refrigeration circuit closed-loop control K and other devices M, K. The circuit assembly 1, in particular for intermediate circuit balancing, comprises a voltage divider SP configurable at the voltage divider ratio. The voltage divider SP consists of multiple (here 6) electric two-terminal devices R1, R2, . . . , R6 by means of which the intermediate circuit voltage UZK is divided into voltage portions on each two-terminal device. As two-terminal devices, it is possible to provide here, for example, adjustable resistors R1, R2, . . . , R6.

Furthermore, the circuit assembly 1 comprises two intermediate circuit capacitors C1, C2 and namely a first intermediate circuit capacitor C1 chargeable to a first portion UZK,1 of the intermediate circuit voltage UZK (or to the intermediate circuit voltage) and a second intermediate circuit capacitor C2 chargeable to a second portion UZK,2 of the intermediate circuit voltage UZK (or to the intermediate circuit voltage).

The voltage divider SP is in parallel connection with the series connection of the two capacitors C1, C2 between which the voltage node 3 is located. From a voltage divider tap A of the voltage divider SP, between the two-terminal devices R3 and R4, a connection line extends to the voltage node 3 between the first and second capacitors C1, C2.

Figure 2:
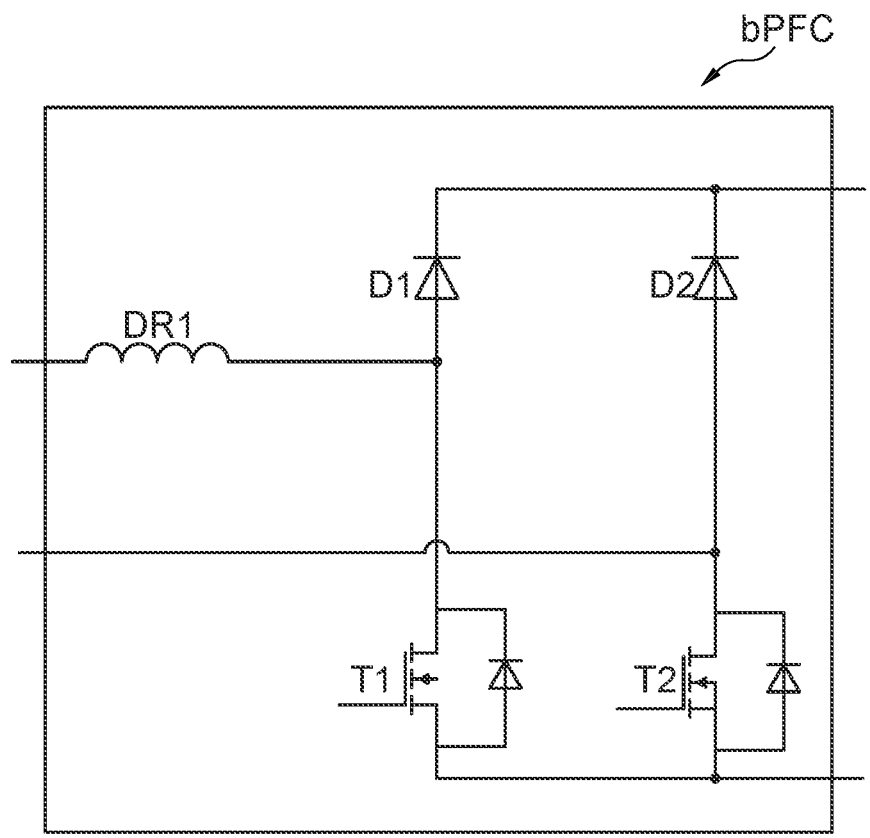

The circuit assembly 1 moreover comprises, before the voltage divider SP, an electronic intermediate circuit processing 2 for processing the intermediate circuit voltage. In the embodiment according to FIG. 1, for this purpose, a DC converter in the form of a flyback converter or boost-buck converter 4 is provided, while in the alternative embodiment of FIG. 2 (which here shows only the alternative intermediate circuit processing 2), a bridgeless power factor correction circuit (bPFC) consisting of the diodes D1, D2 and the transistors T1, T2 is implemented. Furthermore, a choke DR1 is provided in a phase path to the EMC filter 6. A shown in FIG. 1, a galvanic separation 20 is provided between a mains voltage-side input side and an output side of the DC intermediate circuit.

In the embodiment according to FIG. 1, the diodes Dc and Da are provided in one branch and the diodes De and Db are provided in a parallel branch. A node 7 in the first branch leads via the PFC choke DR1 to a node 8 before the diode D1, while a connection of a node 9 in the second branch leads to a node 10 before the diode D2. Furthermore, the transistors T1 and T2 and the inductive coupling coils I1, I2 of the inductive current transmission 4 are represented according to the circuit. The coupling coils are provided for the signal processing I1, I2.

Overall, FIG. 1 shows a system for the common voltage supply of the respective DC/AC output stages of the multiple devices M, K connected on the common circuit.

The DC/AC output stage for the compressor M is connected directly to the voltage from the intermediate circuit. The DC/AC output stages of the pump M and of the fans 1, 2 are connected indirectly via the represented EMC filter 6 by means of the DC converter DC/DC to the intermediate circuit.

The system furthermore comprises a refrigeration circuit closed-loop control K which is connected via the DC converter DC/DC to the intermediate circuit. Also represented is a display 5 for the representation and display of parameters of the refrigeration circuit closed-loop control K or other system data. On the input side, the circuit assembly 1 is connected to the mains voltage UN via an EMC filter 6. With the represented system, in particular the underlying aim of the disclosure and the following advantages can be achieved:

Rectifier losses are minimized or completely eliminated

Less expensive capacitors can be used, since they do not have to have the intermediate circuit voltage level as nominal voltage Increased useful life due to reduction of the voltage on the capacitor At least one central low voltage supply for fans, pumps and other components Monitoring of useful life of individual components is improved/simplified Increase of functional reliability.

The disclosure is not limited in its implementation to the aforementioned preferred embodiment examples. Instead, it is conceivable that another, further optimized intermediate circuit processing is provided.

The invention claimed is:

1. A system for a common voltage supply of respective output stages (DC/AC) of multiple devices (M, K) with a circuit assembly, the circuit assembly configured for balancing of an intermediate circuit voltage (UZK) of a DC intermediate circuit fed by an alternating mains voltage (UN), the system comprising:

a voltage divider configurable in terms of a voltage divider ratio and consisting of multiple electric two-terminal devices by which the intermediate circuit voltage (UZK) is divided into voltage portions at each of the multiple electric two-terminal devices, the multiple electric two-terminal devices being adjustable resistors, at least one first intermediate circuit capacitor chargeable to a first portion (UZK,1) of the intermediate circuit voltage (UZK), and at least one second intermediate circuit capacitor chargeable to a second portion (UZK,2) of the intermediate circuit voltage (UZK), wherein a connection line from a voltage divider tap of the voltage divider is connected between two two-terminal devices of the multiple electric two-terminal devices and the at least one first and second intermediate circuit capacitors in such a manner that the at least one first and second intermediate circuit capacitors are chargeable at a predetermined voltage ratio (UZK,1/UZK,2);

wherein the output stages (DC/AC) of the multiple devices are supplied directly, or indirectly via a DC/DC voltage converter, with a voltage from the DC intermediate circuit;

wherein the circuit assembly comprises an electronic intermediate circuit processor for processing the intermediate circuit voltage (UZK), the electronic intermediate circuit processor located between the alternating mains voltage and the voltage divider, and wherein, for the processing of the intermediate circuit voltage (UZK), a DC converter in the form of a flyback converter or boost-buck converter is used; and wherein the voltage divider tap of the voltage divider is provided centrally between a first plurality of two-terminal devices of the multiple electric two-terminal devices and a second plurality of two-terminal devices of the multiple electric two-terminal devices, the first plurality of two-terminal devices and the second plurality of two-terminal devices each being connected in series, the voltage divider tap being connected to an intermediate tap located between the at least one first and second intermediate circuit capacitors in such a manner that the at least one first and second intermediate circuit capacitors are symmetrically chargeable at the predetermined voltage ratio (UZK,1/UZK,2).

2. The system according to claim 1, wherein the electronic intermediate circuit processor is implemented as a bridgeless power factor correction circuit (bPFC).

3. The system according to claim 1, wherein the electronic intermediate circuit processor is implemented as an interleaved power factor correction circuit.

4. The system according to claim 1, wherein, via the configuration of the adjustable resistors of the multiple electric two-terminal devices, the voltage divider ratio is selectively set for the at least one first and second intermediate circuit capacitors according to a desired ratio.

5. The system according to claim 1, wherein a galvanic separation is provided between a mains voltage-side input side and an output side of the DC intermediate circuit.

6. The system according to claim 1, wherein one of the output stages (DC/AC) of a first device of the multiple devices is supplied directly with the intermediate circuit voltage from the DC intermediate circuit, and wherein a second device of the multiple devices is supplied indirectly via the DC/DC voltage converter with the intermediate circuit voltage from the DC intermediate circuit.

7. The system according to claim 1, wherein the system comprises a refrigeration circuit closed-loop control which is connected to the DC intermediate circuit via the DC/DC voltage converter.

8. The system according to claim 1, wherein the predetermined voltage ratio (UZK,1/UZK,2) is 50/50.

9. The system according to claim 1, wherein all of the multiple devices are supplied with the intermediate circuit voltage from the DC intermediate circuit at the same time.

10. The system according to claim 1, wherein the multiple electric two-terminal devices are located between an output side of the DC intermediate circuit and the at least one first and second intermediate circuit capacitors.

11. The system according to claim 1, wherein the system comprises a refrigeration circuit and the multiple devices (M, K) include at least a compressor, a fan and a pump.

* * * * *